Jan. 14, 1941.  L. D. SOUBIER  2,228,613
MACHINE FOR FORMING GLASS ARTICLES
Filed April 5, 1937  4 Sheets-Sheet 1

Leonard D. Soubier
INVENTOR.

BY Rule & Hoge
ATTORNEYS.

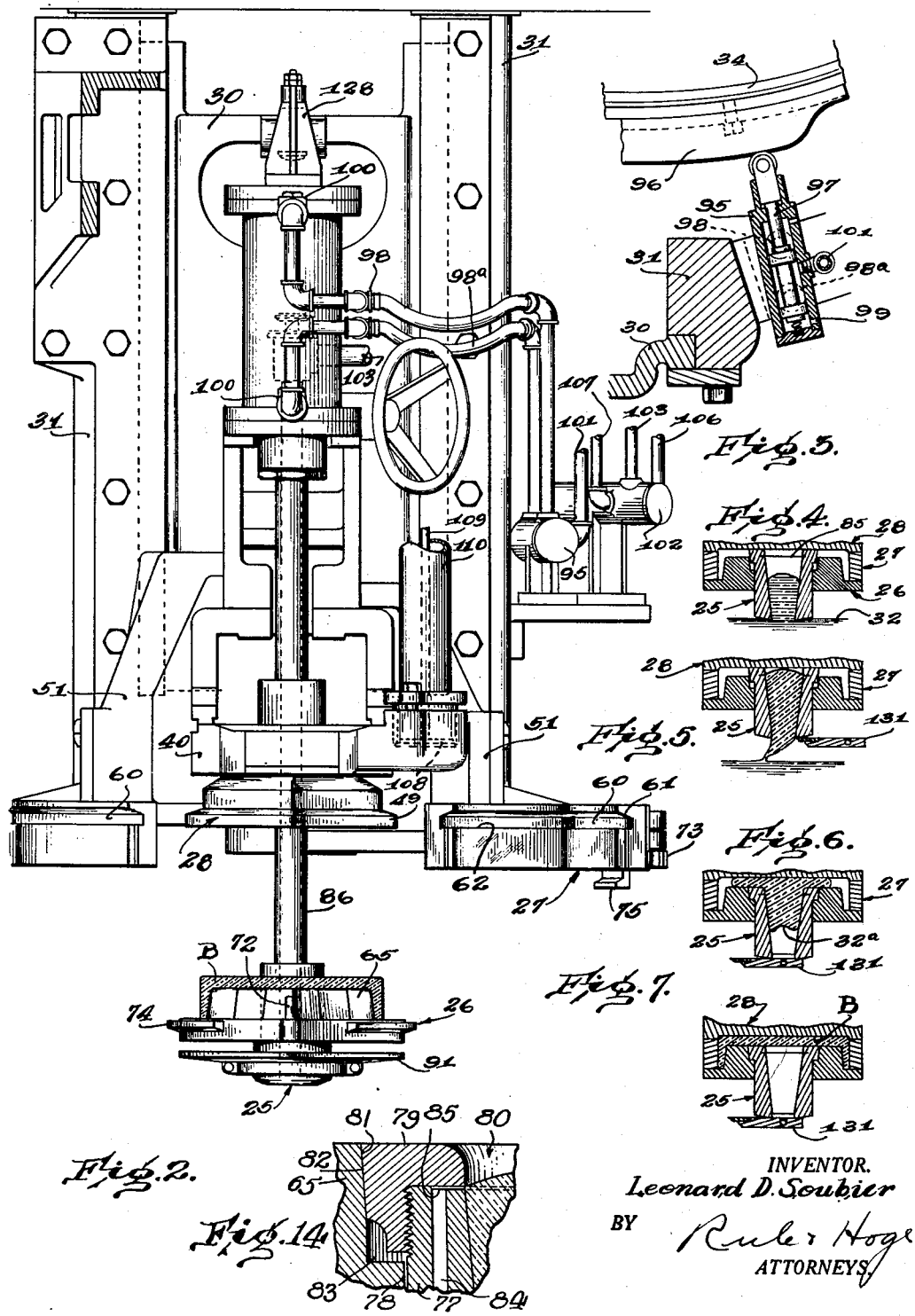

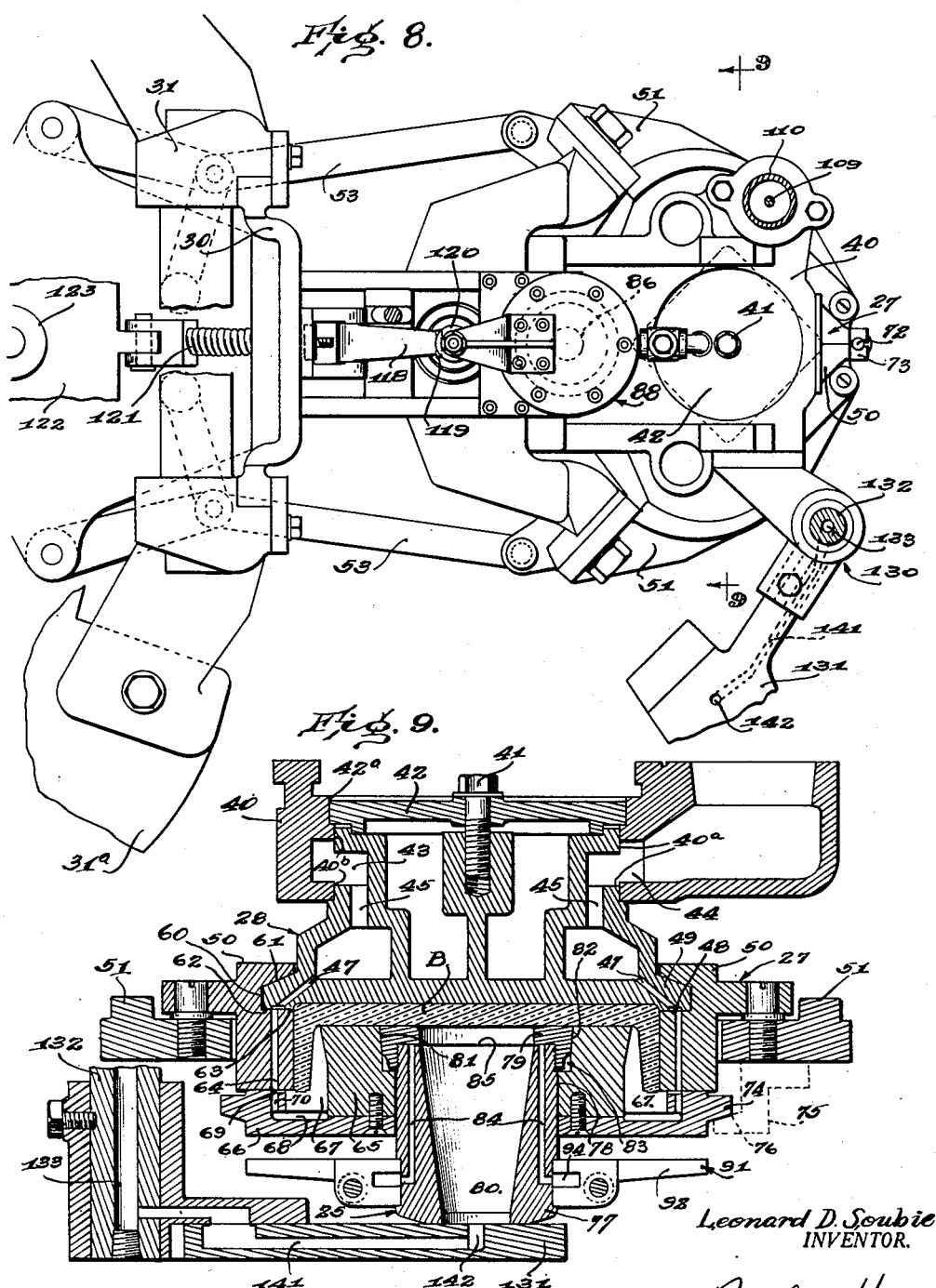

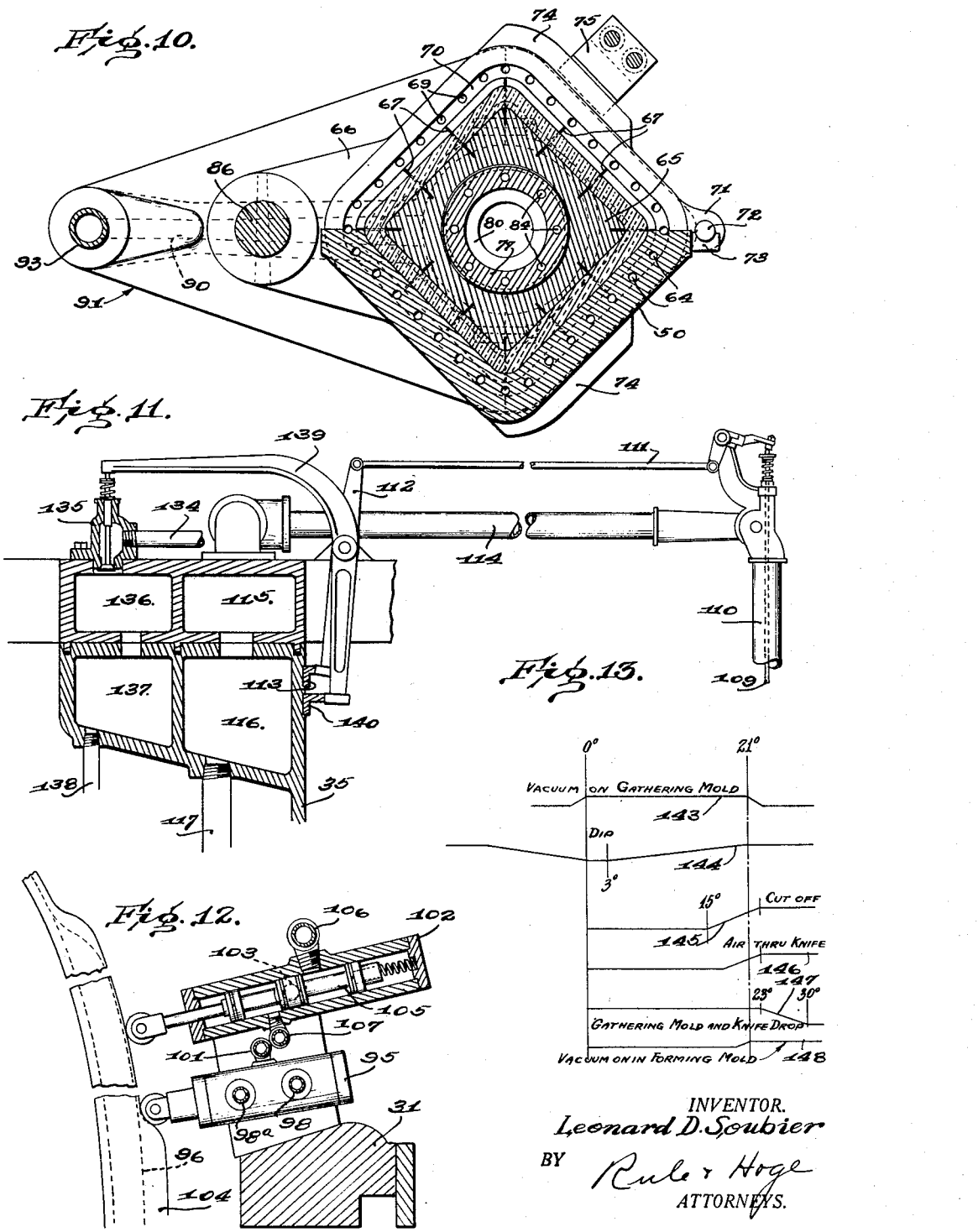

Patented Jan. 14, 1941

2,228,613

UNITED STATES PATENT OFFICE 2,228,613

MACHINE FOR FORMING GLASS ARTICLES

Leonard D. Soubier, Toledo, Ohio, assignor to Owens-Illinois Glass Company, a corporation of Ohio Application April 5, 1937, Serial No. 134,976

17 Claims. (Cl. 49—5)

The present invention relates to a method of and an apparatus for forming glass articles, and for illustrative purposes the invention is embodied in a fully automatic machine of the continuously rotating suction type designed to produce hollow glass building block sections intended to be subsequently united to form a complete hollow glass block unit.

Glass building blocks as now generally produced are formed on flow type machines or presses in which a plunger is necessary to press the glass into final shape. On such machines, the molten glass is discharged or flows from a feeder usually located some distance above the mold in which a charge of glass is to be deposited. This necessitates severing a charge of glass from the supply body at the feeder discharge opening and directing it by means of a trough or funnel to the waiting open mold after which the pressing plunger descends into the mold to press the glass into its final form. The temperature of the glass issuing from the feeder is rapidly lowered on contact with the atmosphere and forms a "skin" or enamel on the severed charge, which continues to become thicker as the charge descends into the mold. It is readily understood that heat is rapidly extracted from the molten glass by contact with the cool surface of the trough, mold and plunger.

Extreme pressure in operating the plunger is utilized to form the block section. This action of the plunger causes an outward spreading of portions of the glass forming the charge, these portions moving at a greater speed than that of the hardened skin on the exterior, thus stretching the skin beyond the breaking point and fracturing it to permit the soft glass to escape into the side walls of the mold. Thus an indeterminate strain is set up within the block by reason of the variation of temperature therein which at times results in an unsatisfactory article.

In the present invention, the mechanism has been so designed and coordinated as to prevent the glass from becoming excessively chilled prior to the final formation thereof. It is an object of this invention to produce a glass block half-section by gathering a charge of glass in a measuring mold by vacuum and by a continuing application of vacuum and air under pressure to cause the glass to move into a finishing mold and simultaneously receive its final form.

A further object is the provision of means for rapidly and uniformly extracting heat from the glass during formation of a block section.

A still further object is the provision of a completely automatic machine for forming glass building blocks by a process employing both vacuum and fluid pressure.

Other objects and features of novelty will be disclosed in the course of the following description.

In the drawings:

Fig. 2 is a front elevational view of the invention showing the molding mechanism open and in discharging position;

Fig. 3 is a sectional plan view of one of a series of valves for controlling the raising and lowering cylinder for the die blocks;

Figure 1:
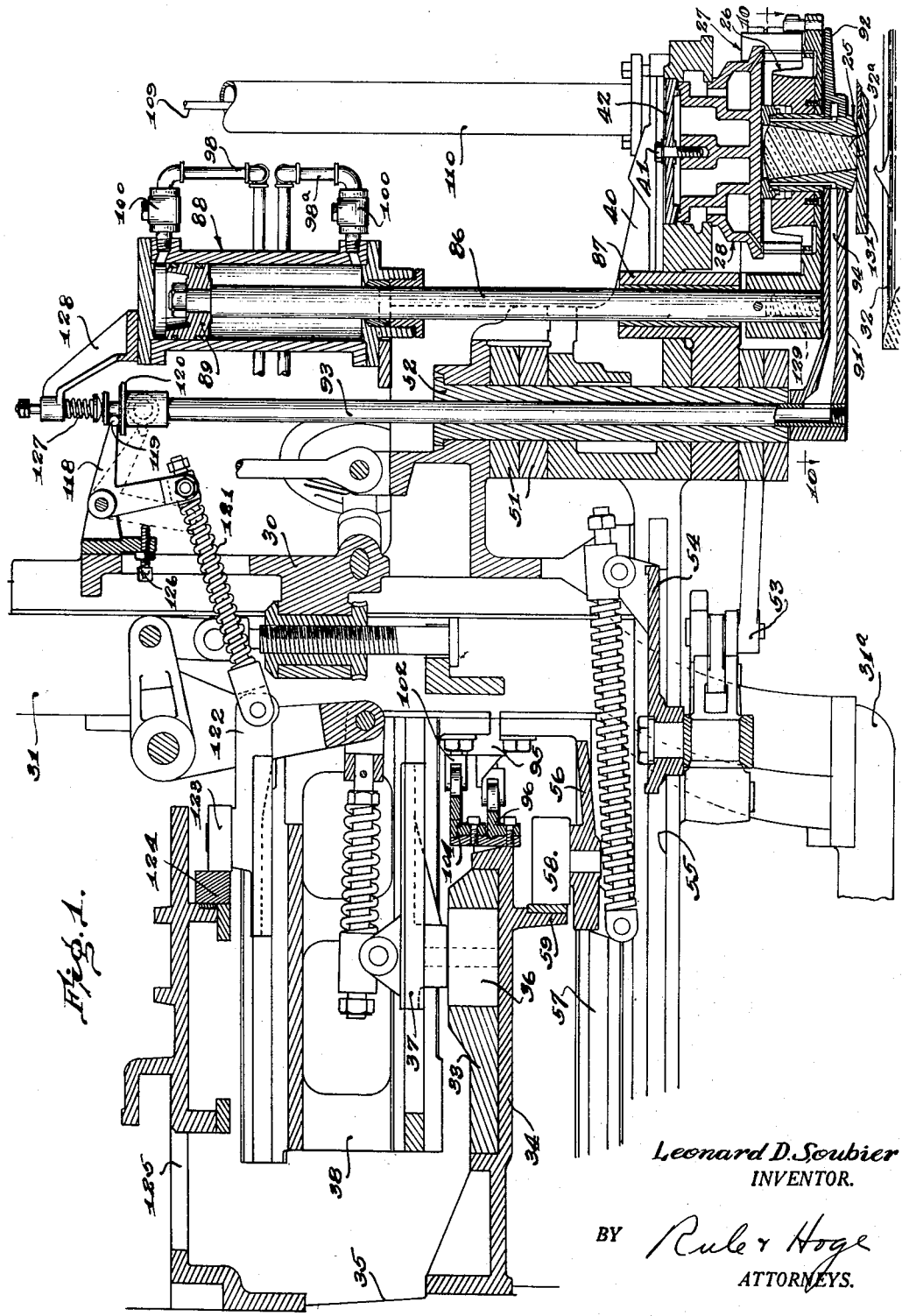
Fig. 1 is a vertical sectional view taken through the center line of one head of a machine embodying the invention and showing the mechanisms in charge gathering position.

Figs. 4 to 7 inclusive illustrate diagrammatically the various steps in the operation of forming a glass block section;

Fig. 4 illustrates the gathering or measuring mold immersed in molten glass and receiving a charge of glass;

Fig. 5 shows the filled gathering mold retracted from the molten glass and prior to the cutoff operation;

Fig. 6 shows the gathering mold lowered to permit the glass to flow into the final forming mold;

Fig. 7 illustrates the finally formed block section prior to the opening of the mold sections for discharging it from the forming mold;

Fig. 8 is a plan view of one head of the machine;

Fig. 9 is a vertical transverse sectional view through the forming head taken on line 9—9 of Fig. 8;

Fig. 10 is a part sectional plan view of the forming molds taken on line 10—10 of Fig. 1;

Fig. 11 is a vertical sectional view of the air and vacuum controls for the forming mold;

Fig. 12 is a sectional plan view of one of a series of valves for controlling the air and vacuum to the gathering mold;

Fig. 13 is a diagrammatic chart of one type of operation of the various units; and Fig. 14 is a detail sectional view showing the structure of the upper end of the gathering mold.

My invention is shown as applied to an Owens suction type bottle forming machine, such as is illustrated in Patent 1,185,687 issued to R. La France, and dated June 6, 1916. Reference may be had to the above patent for a detailed description of the general construction of such of the machine as is not included in the present drawings and description. Referring to Figs. 1 and 2 of the drawings, the invention comprises a gathering mold unit 25 including a die block 26 which cooperates with the gathering or measuring mold to form the inner surface of the block section. The die block 26 cooperates with partible edge molds 27 and a side mold or face mold 28 to complete the body mold unit or head. The molds are supported on a dipping frame 30 mounted for vertical sliding movement in vertical slideways 31 which form a part of a rotating mold carriage 31ᵃ (Figs. 1 and 8).

As each head unit is brought in succession over a supply body of molten glass 32 to receive a charge 32ᵃ, the heads are lowered into the glass by mechanism comprising a dip cam 33 formed on a cam plate 34 which is secured to the stationary central column 35 about which the mold carriage rotates. The cam 33 engages a cam roller 36 mounted on a slide 37 which is carried in a slide frame 38 bolted to the dip frame slideways 31. A bell crank 39 pivoted between the slideways 31 provides connection between the slide 37 and the dip frame 30.

The dip frame 30 extends radially outward from the slideways 31 to provide a dipping head 40 which supports the mold units. Mounted in said head is the face mold 28 (Figs. 1 and 9) which is provided with a cylindrical portion 40ᵃ on its upper end adapted to be received in an opening 40ᵇ in the head casting 40. The face mold 28 is secured against movement relative to the head casting by means of a cap 42 which seats in a recess 42ᵃ formed in the head 40. A bolt 41 serves to clamp the face mold 28 between the cap 42 and the lower face of the head 40. The cap 42 further provides a seal for an annular channel 43 encircling cylindrical portion 40ᵃ of the inner end of the face mold. The channel 43 communicates with a vacuum chamber 44 in the head 40, the purpose of which will become apparent later. Passageways 45 connect the channel 43 with a second chamber 46 adjacent the face of the mold and following substantially the contour thereof, which in the present instance is square. A series of holes 47 extend from the chamber 46 to a vacuum groove 48 in the downwardly directed face of the periphery 49 or rim of the face mold which forms the upper parting line of the mold unit.

The edge molds 27 comprise a pair of partible mold halves 50 (Figs. 1, 2, 8 and 9) supported on mold arms 51 which are pivoted about a hinge pin 52 on the dipping frame 30. The molds are opened and closed by the usual linkage 53 (Figs. 1 and 8) which is connected to a slide 54 mounted in a slideway 55 formed as a part of the head 40. A second slide 56 is mounted in a slideway 57 bolted to the slideways 31 and is yieldably connected to the slide 54. A cam roller 58 carried by the slide 56 is engaged by a cam 59 formed on the cam plate 34 for opening and closing the molds.

Each edge mold section 50 is provided on its inner face with a channel 60 (Fig. 9) adapted to enclose the peripheral rim 49 of the face mold 28. The upper wall 61 of the channel 60 is tapered upwardly and inwardly to engage a corresponding tapered surface on the rim 49 whereby in closing the mold halves 50, the bottom wall 62 of the channel is drawn into sealing engagement with the face of the rim 49. The inner margin of the bottom wall 62 is recessed to form a narrow vacuum slot 63 or groove which provides communication at the parting line of the mold unit between the groove 48 and the interior of the mold for exhausting the air as the mold fills. A series of holes 64 in the mold halves 50 connects vacuum groove 48 with the die block 26 to complete the vacuum system for exhausting the mold.

The die block assembly 26 (Figs. 1, 2, 9 and 10) comprises a substantially rectangular member 65 for forming the inner contour of the block section and is rigidly mounted in a carrier 66 which supports the block in spaced relation with the mold 28. The member 26 is provided with a plurality of narrow saw slots 67 connecting with a shallow annular vacuum chamber 68 formed between the carrier and block, which is in turn connected to the holes 64 by means of passageways 69 formed in the carrier 66 and a narrow groove 70 formed at the parting line between the carrier and edge mold 27. The carrier 66 is provided on the outer corner with a lug 71 (Fig. 10) in which a vertically disposed guide pin 72 is mounted, said pin 72 being adapted to maintain alignment of the carrier with the mold halves 50 by means of ears 73 formed on the outer end of each mold section 50. The carrier 66 is further provided with a pair of ribs 74 (Figs. 9 and 10) extending a short distance along either side thereof, the undersides of which are tapered downwardly and are adapted to be engaged by clamping blocks 75 bolted to the mold arms 51. These blocks 75 have corresponding tapered surfaces and, as the molds close, these tapered surfaces, together with the tapered wall 61 of the channel 60 and the correspondingly tapered surface of the rim 49 cause all of the mold elements to be drawn tightly together and held in position to maintain a pressure-tight seal while fabricating the block section.

The gathering or measuring mold 25 (Fig. 9) comprises the cylindrical body 77 movable vertically in an opening 78 in the center of the die block 65 and is provided on its upper end with the ring 79 which is threaded thereon and forms a part thereof. The cavity 80 of the mold extends completely through the body 77 and is adapted to gather a charge of glass which is later transferred to the body or forming mold. The walls of the cavity 80 slope upwardly and outwardly, thus providing a relatively large opening at the upper end of the cavity through which the charge may flow during the transferring operation. The ring 79 has its outer surface 81 tapered inwardly for engagement with the correspondingly tapered wall 82 of an annular recess 83 formed concentrically with the opening 78 in the die block 65 to limit the downward movement of the mold and form a tight seal between these parts. When the mold 25 is in gathering position, the ring 79 is brought into sealing contact with the face of the mold side or face 28 as shown in Figs. 1, 4 and 5, thereby limiting the space to be exhausted when gathering the charge of glass. The mold 25 is held in this position by mechanism to be described presently and is capable of only limited vertical movement within the die block for the purpose previously described. The lowered position of the mold 25 places the end surface of the ring 79 flush with the top of the die block. Vacuum, controlled independently, for gathering a charge of glass in the gathering mold of each head reaches the cavity 80 through a series of passages 84 in the body of the mold which terminate in a slot 85 formed between the body 77 and ring 79.

The gathering mold 25, while capable of limited movement within the die block 26 and carrier 66, moves with the carrier as a part thereof to discharge the finished block section. Mechanism for supporting and moving the carrier 66 comprises a vertical rod 86 (Fig. 1) mounted on the center line of the head 40 and arranged for reciprocation in a bearing 87 which is held in place on head 40 by the pin 52. The carrier is raised and lowered by an air motor 88 which includes a piston 89 mounted on the end of the rod 86, said motor being bolted to the dip frame 30. The gathering mold 25 is mounted in a holder 91 spaced below the carrier 66 and which supports the mold in its raised position. Fins 92 on the holder extend outwardly from the mold 25 and serve as a shield for protecting the carrier 66 from the intense heat of the molten glass as the heads pass over the exposed portion of the gathering pot. The holder 91 receives a portion of its support from a vertical rod 93 or tube slidably mounted within the hinge pin 52 and projecting upwardly therefrom, said tube supplying both vacuum and air to the holder 91 through a passage 94 in the holder which communicates with the passages 84 in the mold body 77.

Operation of the air motor 88 is controlled by a valve 95 (Figs. 1, 2 and 3), individual to each head, mounted on one of the slideways 31 and actuated by means of a cam 96 which is adjustably mounted on the cam plate 34. The valve comprises a plunger 97 adapted to direct air under pressure to alternate ends of the motor 88 through pipes 98 and 98ª. Exhaust ports 99 are provided in the valve casing opposite pipes 98 and 98ª (Fig. 3) to permit the exhausting air to escape from the open end of the cylinder. Check valves 100 in the pipe lines 98 and 98ª restrict the exhausting air and tend to cushion the stroke of the piston. Air is supplied to the valve through a pipe 101 which is connected to the air supply of the forming machine.

Vacuum for gathering the mold charges and blowing air used in fabricating the block sections is controlled by a combination valve 102 mounted adjacent the valve 95 (Figs. 2 and 12) which is connected to the upper end of the tube 93 by a pipe 103. The valve 102, which is shown in section in Fig. 12, is illustrated as being held in closed position by a cam 104 mounted above the cam 96 on the cam plate 34. The valve comprises a plunger 105 which is capable of moving longitudinally in either direction to place vacuum or air in communication with the pipe 103 leading to the tube 93. Vacuum, from the source of machine supply, is brought to the valve by a pipe 106 and air enters the valve from a pipe 107.

Vacuum is supplied to the forming or body molds from the control mechanism which includes a valve 108 (Fig. 2) located in the head casting 40 for admitting vacuum to the chamber 44 (Fig. 9). The operation of the valve is controlled by a rod 109 extending upwardly through a pipe 110 and suitable control linkage 111 (Fig. 11), which is connected to a cam lever 112 and operated by a cam 113 mounted on the stationary column 35. A pipe 114 connects the pipe 110 with a chamber 115 formed in the upper portion of the rotating mold carriage and is in constant communication with a stationary supply chamber 116 formed in the column 35 of the machine and to which vacuum is supplied through a pipe 117 from a source not shown.

When the mold unit is closed and ready for gathering and forming, the gathering mold 25 is held in its raised position by a bell crank 118 (Figs. 1 and 8) pivoted to and near the top of the dip frame 30. The outer end of the crank 118 is formed with a cross head 119 adapted to engage a flanged head 120 carried by the tube 93. The lower end of the crank 118 is yieldably connected at 121 to a slide member 122 slidably mounted in the frame 38 and carries a cam roller 123. The mechanism is operated by a cam 124 formed on a cam plate 125 secured to the central column 35 and which cooperates with the roller 123. At the releasing of pressure on the connection 121 by the cam 124, the bell crank lever 118 moves to the dotted line position shown in Fig. 1 which is regulated by a locking set screw 126 to hold the crosshead 119 in position to be picked up by the lower flange on the head 120 at each upward movement of the tube 93. A spring controlled pusher 127 is mounted directly over the tube 93 in a bracket 128 bolted to the motor 88 to lower the gathering mold for completing the operation of forming the block section. A coil spring 129 disposed within the lower end of the rod 86 bears against the holder 91 and provides positive means for maintaining the proper relation of the gathering mold and carrier while they are being lowered to the discharging position.

When the gathering mold 25 has been filled and raised out of contact with the supply body 32, the trailing glass is sheared from the mold by a cutoff knife 130 (Figs. 1, 8 and 9) which comprises a shear blade 131 supported on a rock shaft 132. Mechanism for operating the knife is illustrated in the previously noted patent to LaFrance. The shaft 132 is provided with a longitudinal passage 133 for leading air under pressure to the shear blade 131, said passage being connected at its upper end by an ordinary flexible means (not shown) to a pipe 134 (Fig. 11) leading to a valve 135 mounted on an air chamber 136 in the upper portion of the carriage 90 near the center of the machine. The chamber 136 is in constant communication with a supply chamber 137 formed adjacent the vacuum chamber 116 in the central column 35 and receives its supply through a pipe 138 from a source not shown. The valve 135 is periodically actuated by a lever 139 pivoted to the distributing head, the movement of which is controlled by a cam 140 on the column 35. The shear blade 131 is provided with a passage 141 which terminates in a vertical opening 142, and which is positioned so as to lie beneath the gathering mold cavity 80 when the shearing stroke of the knife is completed. Air flowing through the shear blade into the cavity 80 accelerates the speed with which the glass is transferred from the gathering mold to the body or forming mold, thus lessening the time interval required for this operation. It is to be understood, however, that it is within the scope of the present invention to draw the charge into the body mold solely by the application of vacuum to the mold cavity 80 through the passages 84 or to impel the charge into the body mold solely by application of air under pressure through the passages 141 and 142.

*Operation of the mold unit*

Figures 4 to 7, inclusive, and 13 illustrate the various steps through which a charge of glass 32ª passes to form a finished block section B. With the parts in the position illustrated in Fig. 4, vacuum is applied to the gathering mold 25 through the tube 93 and holder 91 by the shifting of the valve plunger 105 in the valve 102 approximately simultaneous with the contact of the mold with the surface of the supply body of molten glass 32. Thus the molten glass is drawn into the mold until it reaches the height of the slot 85 which is spaced below the surface of the face mold 28 a sufficient distance to prevent contact of the glass therewith, and as the glass covers the slot 85, the drawing-in of additional glass is prevented, thereby allowing the mold to gather only a predetermined charge. The line 143 in Fig. 13 illustrates diagrammatically the period of time in which the vacuum is on in the gathering mold, the heads moving from left to right. As the head is coming out of dip at 144, the knife 130 starts its swing as at 145. Fig. 5 also shows the knife blade 131 prior to severing the trailing glass. Slightly before the knife 130 completes its swing, the valve 135 opens to admit blowing air to the knife as at 146. Simultaneous with completion of the cutoff, the gathering mold 25 and shear blade 131 move downwardly by release of pressure on the bell crank 118 to the position indicated in Fig. 6 and by line 147 in Fig. 13, the vacuum valve 108 being opened as at 148 prior to the movement of the mold and knife. The opening of valve 108 causes the evacuation of the body mold cavity which, in addition to the air pressure being applied to the bottom of the charge, produces a differential pressure between the molds and causes a rapid transfer of the glass from the gathering mold cavity 80 into the body mold. The hotter glass from the core of the gathered charge spreads radially outward into the forming mold cavity as it flows in a welling motion over the edge of the ring 79, thereby moving the portions chilled by momentary contact with the wall of the mold 25 out of contact therewith. After the glass has been exhausted from mold 25 and is within the confines of the body mold, the position of the valve plunger 105 is reversed to provide additional air pressure and aid as a cooling means for the finished block as indicated in Fig. 7. When the block B has cooled sufficiently, the valves are closed to shut off all vacuum and air so that the edge molds 50 may be opened, at which time the valve 95 operates to lower the carrier and the finished block to the discharging position shown in Fig. 2.

It will be observed from the foregoing that the glass forming a mold charge is kept moving in a substantially constant manner, which prevents excessive chilling of any part thereof and consequently limits the possibility of strains being set up in the walls of the block.

Modifications may be resorted to within the spirit of the invention and scope of the subjoined claims:

I claim:

1. In a machine for producing glass articles, a measuring mold, the cavity of which has a capacity to contain only the volume of glass intended to be present in the finished article, a body mold, a portion of said measuring mold cooperating with said body mold to provide a body mold cavity having a configuration conforming to the shape of an article to be formed, means for delivering a charge of molten glass to said measuring mold cavity, means for bringing the two molds into register with each other, and means for effecting movement of the entire charge of molten glass contained in the measuring mold into the body mold and for simultaneously causing the glass to assume the shape of the body mold cavity.

2. In a machine for producing glass articles, a gathering and measuring mold, the cavity of which has a capacity to contain only the volume of glass intended to be present in the finished articles, a body mold, a portion of said gathering mold cooperating with said body mold to provide a body mold cavity having a configuration conforming to the shape of an article to be formed, suction means for delivering a charge of molten glass to said gathering and measuring mold cavity, means for bringing the two molds into register with each other, and suction means for effecting movement of the entire charge of molten glass contained in the gathering and measuring mold into the body mold and for simultaneously causing the glass to assume the shape of the body mold cavity.

3. In a machine for producing glass articles, a gathering mold having a cavity extending completely therethrough adapted to contain only the volume of glass intended to be present in the finished articles, a body mold, means for bringing the lower end of said gathering mold into charging contact with a supply body of molten glass, means for applying vacuum to said cavity to draw a charge of molten glass thereinto, the upper end of said body mold closing the other end of said gathering mold during the vacuum applying charging operation, means for moving said molds relative to each other to bring the same into register with each other, and means for effecting movement of the entire charge of molten glass contained in the gathering mold into the body mold and for simultaneously causing the glass to assume the shape of the body mold cavity.

4. In a machine for producing glass articles, a gathering mold having a cavity extending completely therethrough adapted to contain only the volume of glass intended to be present in the finished articles, a body mold, means for bringing the lower end of said gathering mold into charging contact with a supply body of molten glass, means for applying vacuum to said cavity to draw a charge of molten glass thereinto, the upper end of said body mold closing the other end of said gathering mold during the vacuum applying charging operation, means for moving said molds relative to each other to bring the same into register, and suction means for effecting movement of the entire charge of molten glass contained in the gathering mold and for simultaneously causing the glass to assume the shape of the body mold cavity.

5. In a machine for producing glass articles, a gathering mold, the cavity of which has a capacity to contain only the volume of glass intended to be present in the finished articles, a body mold, a portion of said gathering mold cooperating with said body mold to provide a body mold cavity having a configuration conforming to the shape of an article to be formed, means for delivering a charge of molten glass to said gathering mold cavity, means for bringing the two molds into register with each other, and combined vacuum pressure and air pressure means for respectively drawing and impelling the entire charge of molten glass contained in the gathering mold bodily into the body mold and for simultaneously causing the glass to assume the shape of the body mold cavity.

6. In a machine for producing hollow glass articles, a gathering mold having a cavity extending completely therethrough adapted to contain only the volume of glass intended to be present in the finished articles, a body mold, means for bringing one end of said gathering mold into charging contact with a supply body of molten glass, means for applying vacuum to said cavity to draw a charge of molten glass thereinto, said body mold closing the other end of said gathering mold during the vacuum applying charging operation, means for moving said molds relative to each other to bring the same into register, and combined vacuum pressure and air pressure means for respectively drawing and impelling the entire charge of molten glass contained in the gathering mold bodily into the body mold and for simultaneously causing the glass to assume the shape of the body mold cavity.

7. In a machine for producing glass articles, a gathering mold, the cavity of which has a capacity to contain only the volume of glass intended to be present in the finished article, a body mold, a portion of said gathering mold cooperating with said body mold to provide a body mold cavity having a configuration conforming to the shape of an article to be formed, vacuum means for delivering a charge of molten material to said gathering mold cavity, means for bringing the two molds into register and contact with each other, and combined vacuum pressure and air pressure means for respectively drawing and impelling the entire charge of molten glass contained in the gathering mold bodily into the body mold and for simultaneously causing the glass to assume the shape of the body mold cavity.

8. In a machine for producing hollow glass articles, a gathering mold having a cavity extending completely therethrough adapted to contain only the volume of glass intended to be present in the finished article, a body mold, means for bringing one end of said gathering and forming mold into charging contact with a supply body of molten glass, means for applying vacuum to said cavity to draw a charge of molten glass thereinto, said body mold closing the other end of said gathering mold during the vacuum applying operation, a portion of said gathering mold cooperating with said body mold to provide a body mold cavity having a configuration conforming to the shape of an article to be formed, means for moving said molds relative to each other to bring the same into register, and combined vacuum pressure and air pressure means for respectively drawing and impelling the entire charge of molten glass contained in the gathering mold bodily into the body mold cavity and for simultaneously causing the glass to assume the shape of said body mold cavity.

9. In a machine for producing hollow cup-shaped glass block sections, a gathering mold having a cavity extending completely therethrough adapted to contain only the volume of glass intended to be present in the finished article, a body mold, means for bringing one end of said gathering mold into charging contact with a supply body of molten glass, means for applying vacuum to said cavity to draw a charge of molten glass thereinto, said body mold closing the other end of said gathering mold during the vacuum applying operation by direct contact therewith, a portion of said gathering mold cooperating with said body mold to provide a body mold cavity having a configuration conforming to the shape of an article to be formed, means for withdrawing said gathering mold from contact with said body mold to cause said cavities to register, and vacuum pressure means for drawing the entire charge of molten glass contained in the gathering mold bodily into the body mold cavity and for simultaneously causing the glass to assume the shape of said body mold cavity.

10. In a machine for producing hollow cup-shaped glass block sections, a gathering mold having a cavity extending completely therethrough adapted to contain only the volume of glass intended to be present in the finished article, a body mold, means for bringing one end of said gathering mold into charging contact with a supply body of molten glass, means for applying vacuum pressure to said cavity to draw a charge of molten glass thereinto, said body mold closing the other end of said gathering and forming mold during the vacuum applying operation by direct contact of the bottom of said body mold with said latter end of the gathering mold, means for moving said gathering mold relative to said body mold to cause said cavities to register, and vacuum pressure means for drawing the entire charge of molten glass contained in the gathering mold bodily into the body mold cavity and for simultaneously causing the glass to assume the shape of said body mold cavity.

11. In a machine for producing hollow glass building block sections, a gathering mold, a body mold, said molds each having a mold cavity, means for delivering a charge of molten glass of a volume substantially equal to the volume of said body mold cavity to said gathering mold cavity, means for applying air under pressure to said gathering mold cavity, and means for applying vacuum pressure to said body mold cavity to cause the entire body of glass of said charge to flow from said gathering mold cavity to said body mold cavity.

12. In a machine for producing glass building block sections, a gathering mold having a cavity extending completely therethrough, a body mold having a cavity conforming to the shape of a block section to be formed, said gathering mold extending into said body mold cavity and contacting one face of the body mold in sealing engagement therewith to close one end of said gathering mold cavity, means for delivering a charge of molten glass to said gathering mold cavity, means for moving said gathering mold relative to said body mold face to establish communication between said cavities, and means for establishing a differential pressure between said cavities to cause the entire body of said charge to flow from said gathering mold cavity to said body mold cavity.

13. In a machine for producing glass building block sections, a gathering mold having a cavity extending completely therethrough, said cavity having upwardly and outwardly sloping walls whereby the upper end thereof is larger than the lower end thereof, a body mold having a cavity conforming in shape to the shape of a block section to be formed, said gathering mold extending into said body mold cavity with the upper end of said cavity being sealed by one face of said body mold, means for delivering a charge of molten glass to said gathering mold cavity, means for moving said gathering mold relative to said face to establish communication between said cavities through said larger end of said gathering mold cavity, and means for establishing a differential pressure between said cavities to cause the entire body of said charge to flow from said gathering mold cavity to said body mold cavity.

14. In a machine for molding substantially cup-shaped glass articles, a gathering mold the cavity of which has a capacity designed to contain only the volume of glass intended to be present in the finished article, a body mold, means for delivering a mold charge of molten glass to said gathering mold, means for bringing the two molds into register and contact prior to delivery of the mold charge to the gathering mold and for separating the molds upon completion of said delivery of the mold charge, and means for effecting movement of the entire mold charge contained in the gathering mold into the body mold and for simultaneously causing the glass to assume its final shape in the body mold cavity immediately upon separation of the molds.

15. In a machine for molding substantially cup-shaped glass articles, a gathering mold the cavity of which has a capacity designed to contain only the volume of glass intended to be present in the finished article, a body mold, means for delivering a mold charge of molten glass to said gathering mold, means for bringing the two molds into register and contact prior to delivery of the mold charge to the gathering mold and for separating the molds upon completion of said delivery of the mold charge, and means for applying differential pneumatic pressure to the opposite ends of the mold charge in the gathering mold immediately upon separation of the molds, to thereby effect movement of the entire mold charge into the body mold and transform it into a finished article.

16. In a machine for producing hollow cup-shaped glass articles, a gathering mold having a cavity the capacity of which is such that it will contain only the volume of glass intended to be present in the finished articles, a body mold having a cavity conforming to the shape of the finished cup-shaped articles, means for bringing the two molds into register and contact with each other with the cavities thereof in communication and with the portion of the body mold cavity corresponding to the open ends or rims of the articles remote from the meeting surfaces of the two molds, and means for effecting movement of the entire charge of molten glass contained in the gathering mold into the body mold and for simultaneously causing the glass to assume the shape of the body mold cavity.

17. In a machine for producing a hollow glass article, a gathering mold having a cavity provided with opposed inlet and outlet openings, a body mold into the cavity of which the outlet end projects and with the cavity wall of which it has sealing contact during charging of the gathering mold, means for delivering a mold charge of glass to the gathering mold while the latter is in contact with said wall, means for breaking said contact and means for then effecting movement of the entire mold charge into the body mold.

LEONARD D. SOUBIER.